United States Patent [19]

Toma

[11] Patent Number: 5,146,070

[45] Date of Patent: Sep. 8, 1992

[54] DRIVE DEVICE FOR USE WITH THE INFORMATION RECORDING/REPRODUCING APPARATUS

[75] Inventor: Tomohide Toma, Hachioji, Japan

[73] Assignee: Olympus Optical Co., Ltd., Tokyo, Japan

[21] Appl. No.: 654,082

[22] Filed: Feb. 11, 1991

[51] Int. Cl.⁵ .......................................... G06K 13/00
[52] U.S. Cl. ................................. 235/475; 271/265
[58] Field of Search ................ 271/265; 235/475, 477, 235/480; 369/291

[56] References Cited

U.S. PATENT DOCUMENTS

| | | | |
|---|---|---|---|
| 4,150,784 | 4/1979 | Moorman et al. | 235/480 |
| 4,803,349 | 2/1989 | Sugimoto et al. | 235/475 |

FOREIGN PATENT DOCUMENTS

| | | | |
|---|---|---|---|
| 3313355 | 10/1984 | Fed. Rep. of Germany | 235/475 |
| 56-105171 | 8/1981 | Japan . | |
| 57-29958 | 2/1982 | Japan . | |
| 96243 | 5/1987 | Japan | 271/265 |
| 81289 | 3/1990 | Japan | 235/475 |
| 81290 | 3/1990 | Japan | 235/475 |

*Primary Examiner*—John W. Shepperd
*Attorney, Agent, or Firm*—Frishauf, Holtz, Goodman & Woodward

[57] ABSTRACT

An information recording and reproducing apparatus includes a housing provided with an opening through which an optical card is inserted into the housing and which is selectively opened and closed by a shutter, and rollers for conveying the inserted optical card to a recording/reproducing section. The shutter and conveying rollers are simultaneously moved by a motor through a transmitting mechanism.

9 Claims, 4 Drawing Sheets

DRIVE DEVICE FOR USE WITH THE INFORMATION RECORDING/REPRODUCING APPARATUS

BACKGROUND OF THE INVENTION

1. Field of the Invention

The present invention relates to a drive device for use with the information recording and/or reproducing apparatus which is intended to record and/or reproduce information against a card-like information recording medium, for example.

2. Description of the Related Art

There have been proposed various kinds of the information recording/reproducing apparatuses which are intended to optically record/reproduce information on/from the card-like information recording medium. In the case of these apparatuses, an optical card is inserted into the apparatus through a card inserting opening, which is then closed by a shutter to prevent two of the cards from being inserted into the apparatus at once. The card which has been inserted into the apparatus is carried to a certain position in the apparatus by a carrier system and originally positioned there. An optical pickup is then moved and originally positioned to locate at a certain point on the optical card. The optical card is then moved in its track direction while focus- and tracking-controlling the optical pickup, thereby enabling information to be recorded on and reproduced from the optical card. When this recording or reproducing of information is finished, the optical card is discharged outside the apparatus through the card inserting opening.

The shutter systems used by the apparatuses to open and close the card inserting opening can be generally grouped into two. One of them includes a shutter 33 located in an opening 31 into which a card 30 is inserted, and moved up and down by through a spring member 32 in a direction perpendicular to the direction in which the card 30 is inserted into the opening 31, as shown in FIG. 1. When the card 30 is to be inserted into the opening 31, the shutter 33 is pushed up by the card 30 which is forced into the opening 31 and the opening 31 is thus opened. When the card 30 is inserted into the apparatus through the opening 31, the shutter 33 is forced by the spring member 32 to again close the opening 31. After it is inserted into the apparatus, the card 30 is carried to a card processing section by a carrying roller 25 and its pairing roller 26. This conventional shutter system is disclosed in the Japanese Utility Model Disclosure Sho 56-105171.

The other shutter system is as shown in FIG. 2. A photo-interrupter 27 which detects the insertion of the card 30 into the opening 3 and which is arranged at the opening 31 drives a solenoid 28 connected to the shutter 33 which closes the opening 31, when the card 30 is inserted into the opening 31. When power is supplied to the solenoid 28 which serves as a drive source, the shutter 33 is driven to open the opening 31 and when the supply of power is stopped to the solenoid 28, the shutter 33 is driven to close the opening 31. The supply of power is controlled in this case through a circuit used only for this purpose. This conventional shutter system is disclosed in the Japanese Utility Model Disclosure Sho 57-29958.

The former of these conventional shutter systems is intended to contact the card with the shutter at the opening and forcedly push up the shutter by the friction of the card against the shutter. This causes the card to be damaged and when the card is repeatedly inserted into the apparatus through the opening, its life can be shortened.

The latter of them causes no problem as mentioned above, but it needs its drive source, its drive and control circuits. This makes the apparatus complicated, large in size and high in cost.

SUMMARY OF THE INVENTION

The object of the present invention is therefore to provide a drive device for use with the information recording and/or reproducing apparatus, having a simpler arrangement to drive its corresponding components and capable of protecting the information recording medium from being damaged by the shutter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Some embodiments of the drive system for use with the information recording and reproducing apparatus according to the present invention will be described in detail with reference to the accompanying drawings.

Figure 1:
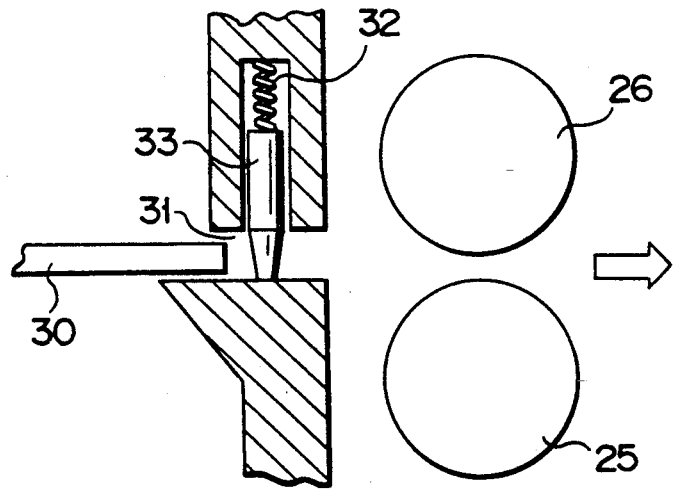
FIGS. 1 and 2 are views schematically showing the conventional shutter and carrier systems.
Figure 2:
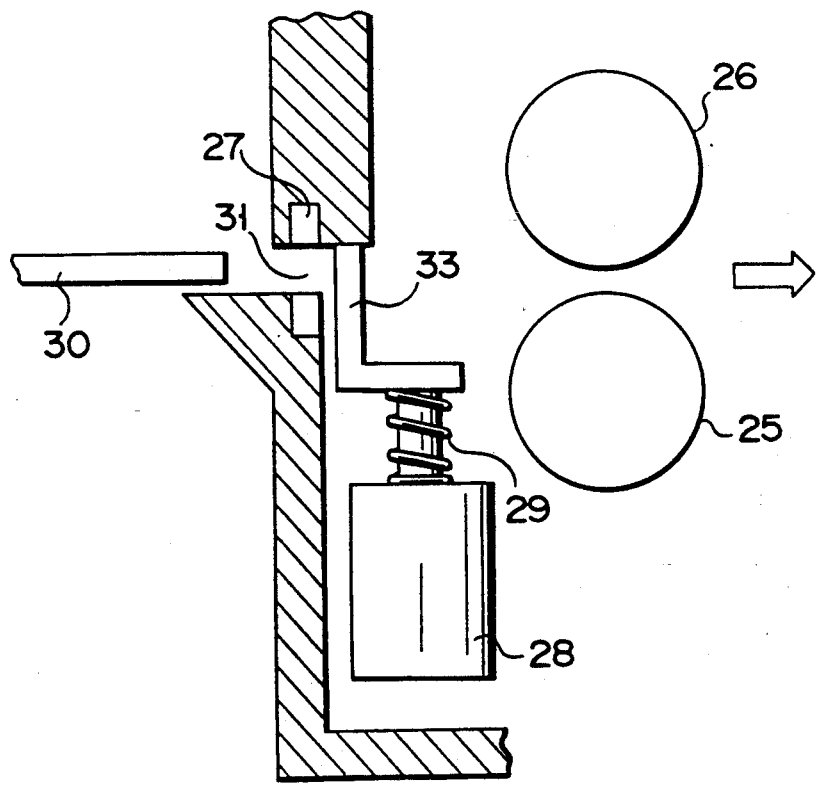
Figure 3A:
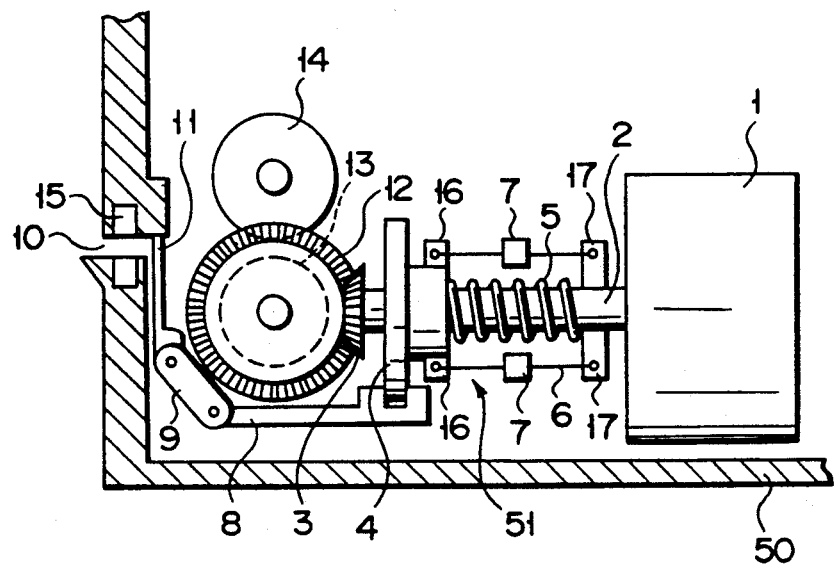
FIGS. 3A and 3B are views for showing an embodiment of the drive device for us with the information recording and reproducing apparatus according to the present invention, in which the state of the drive device shown in FIG. 3A is different from that of it shown in FIG. 3B.

In FIG. 3A which shows a first embodiment of the drive system according to the present invention, reference numeral 50 represents a housing in which an optical head (not shown) is housed to record and reproduce information on and from a recording medium such as the optical card and which is provided at a front wall thereof with an opening 10 through which the recording medium (or optical card in this case) is inserted and discharged. A reversible motor 1 fixed in the housing 50 has a rotating shaft 2 which horizontally extends forward. A bevel gear 3 is coaxially fixed to the front end of the rotating shaft 2 and a slider 4 is fitted onto the rotating shaft 2 between the bevel gear 3 and the motor 1 to rotate together with the shaft 2 and slide in the axial direction of the shaft 2. A holder member having a pair of first arms 17 extending in reverse directions at an angle of 180° relative to each other is fixed to the base end of the rotating shaft 2. A compression coil spring 5 is fitted around the rotating shaft 2 between the holder member and the slider 4 to urge the slider 4 forward. A pair of second arms 16 extending similarly to the first arms 17 are fixed to the slider 4. Wires 6 are stretched between the first 17 and the second arms 16 and a weight 7 is supported by each of the wires 6 at the center thereof.

The lower end of the slider 4 is engaged with the rear end of a rod 8 which is located near the bottom of the housing 50, horizontally extending forward and backward. This engagement of the slider 4 to the rod 8 is made in such a way that the rod 8 is not rotated by the rotation of the slider 4 but that when one of them moves forward and backward, the other follows it. The rod 8 is supported by a guide member (not shown) fixed to the housing 50 to move forward and backward. The front end of this rod 8 is pivoted on the rear end of a link 9, on the front end of which the lower end of a shutter 11 is pivoted. The shutter 11 extends in the vertical direction and is supported by a guide member (not shown) to vertically move between a position where the opening 10 is closed and another position (shown in FIG. 3B) where the opening 10 is opened.

Figure 4:
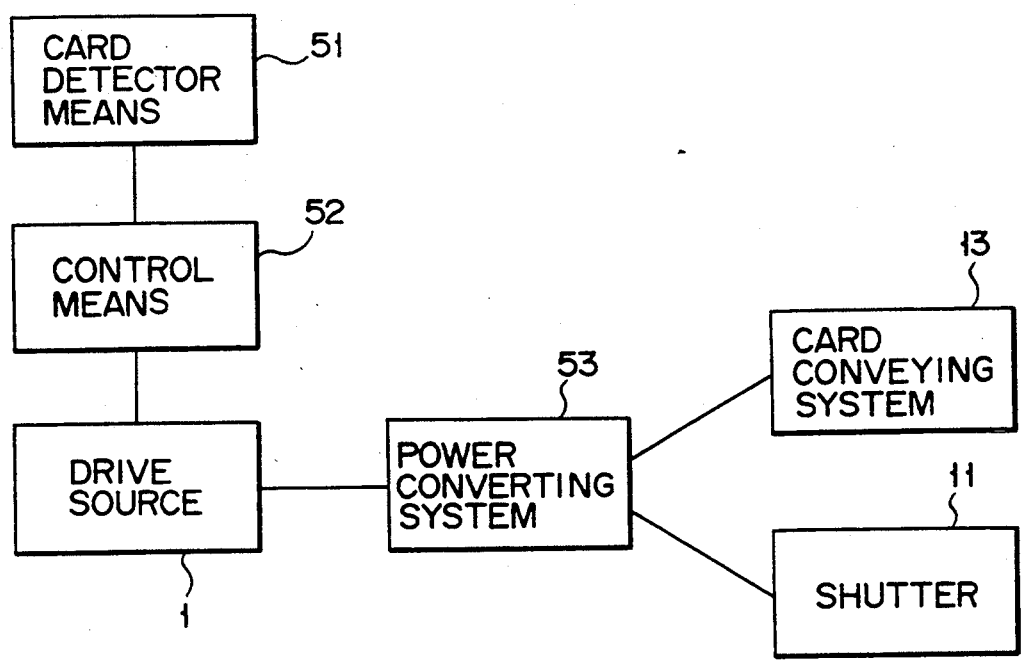
FIG. 4 is a block diagram showing how components for the system are connected to one another.

The bevel gear 3 is engaged with a large bevel gear 12 which is arranged rotatable in the housing 50. A carrying or conveying roller 13 is coaxially fixed to the large bevel gear 12. The conveying roller 13 is located behind the opening 10, together with a roller 14 which is opposed to the roller 13 from above, and rotatably supported by bearings arranged in the housing 50. A first photo-interrupter 15 which detects an optical card 18 inserted into the opening 10 and creates an output signal in response to the optical card 18 detected is arranged in the opening 10. Another second photo-interrupter (not shown) similar to the first one is also located behind a conveying system which comprises the rollers 13 and 14, and it detects the optical card 18 sent near the conveying system after the recording and reproducing of information relative to the card is finished. These first and second photo-interrupters form a card detector means 51 shown in FIG. 4. As shown in FIG. 4, the card detector means 51 is connected to a control circuit 52 which serves to control the power source or motor 1. The control circuit 52 controls the motor 1 to rotate in the forward direction for a certain time period in response to signal received from the first photo-interrupter and in the backward direction for a certain time period in response to signal received from the second photo-interrupter.

It will be described how the above-described system is operated.

Figure 3B:
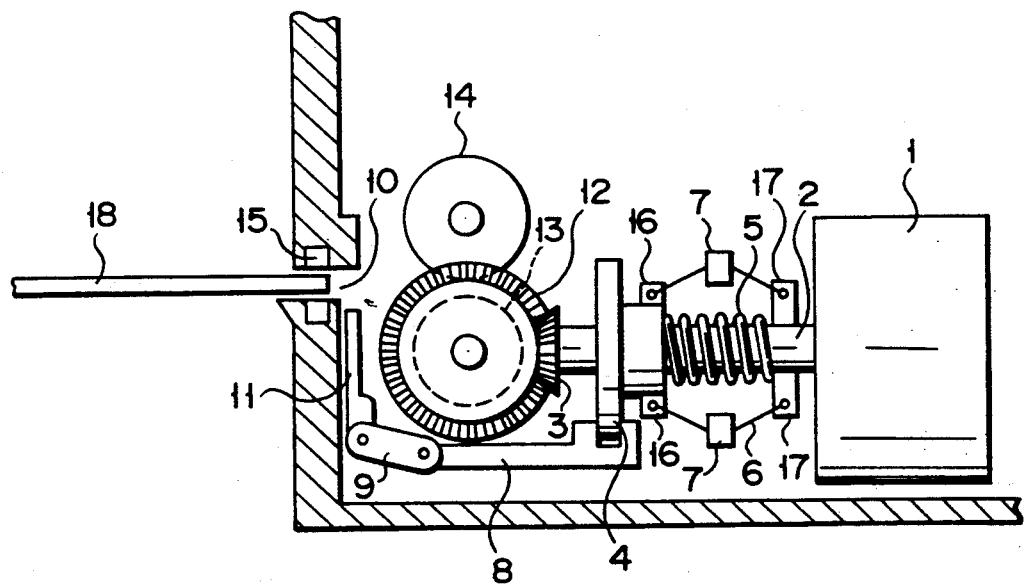

When the optical card 18 is inserted into the opening 10 and detected by the photo-interrupter 15 (or card detector means 51) under such a state as shown in FIG. 3A, the motor 1 is rotated in the forward direction by the control circuit 52. As the result, the conveying roller 13 is rotated clockwise in FIG. 3A by the rotating shaft 2 through the bevel gear 3 and the large bevel gear 12. The second arms 16 and the first arms 17 are rotated at the same time by the rotation of the shaft 2, thereby causing centrifugal force to be added to the weights 7 supported by the wires 6. As shown in FIG. 3B, therefore, the wires 6 are radially pulled outward by the weights 7 to slide the slider 4 backward against the force of the coil spring 5. The rod 8 is moved backward, following the sliding slider 4, and the shutter 11 is shifted downward through the link 9 to open the opening 10.

The optical card 18 is inserted into the housing 50 through the opening 1 thus opened. When the front end of the optical card 18 reaches between the conveying roller 13 and its opposing roller 14, the card 18 is further conveyed into the housing 50 while being held between the rotating rollers 13 and 14. When the rear end of the card 18 is released from between the rollers 13 and 14, the motor 1 is stopped. The weights 7 are released from the centrifugal force added and the slider 4 is shifted forward by the coil spring 5 to return to its original position. As the result, the shutter 11 is lifted through the rod 8 and the link 9 to close the opening 10. The rotation of the roller 14 is stopped almost at the same time and the insertion of the optical card 18 into the housing 50 is thus finished.

Information is recorded on or reproduced from the optical card 18 thus inserted according to the well known manner by means of the optical head.

When this recording or reproducing process is finished, the optical card 18 is carried to the conveying system of the rollers 13 and 14 automatically or by an ejector button (not shown) manually operated. The optical card 18 carried to the rollers 13 and 14 is detected by the card detector means 51 and the motor 1 is rotated in the backward direction by the control circuit 52. As the result, the conveying roller 13 is rotated anti-clockwise through the rotating shaft 2, the bevel gear 3 and the large bevel gear 12 and the optical card 18 is further carried forward by the rollers 13 and 14. The shutter 11 is moved downward at the same time of this card-carrying operation by the same action of the weights 7 as described above to thereby open the opening 10. The optical card 18 is carried outside the housing 50 through the opening 10 thus opened.

Figure 5:
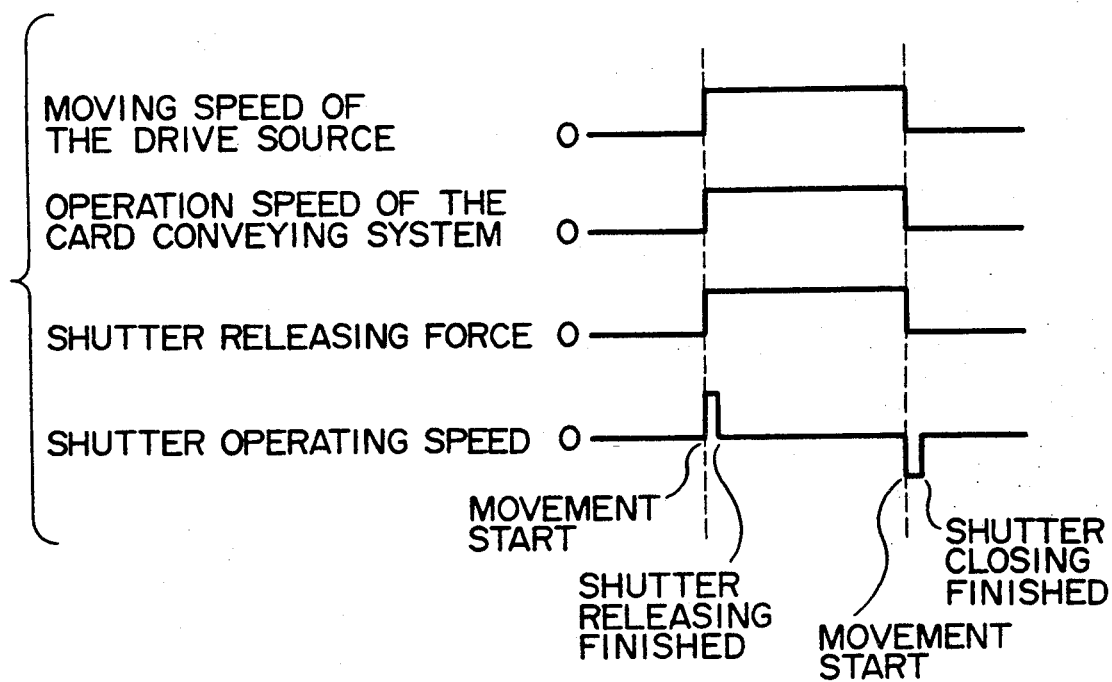
FIG. 5 is a time chart showing how the components for the system are operated relative to one another.

FIG. 4 shows the arrangement and operation of the above-described system in a block diagram and FIG. 5 shows timings at which components for the system are made operative one another. A power converting system or power transmitting means 53 shown in FIG. 4 serves to drive both of the card conveying system including the rollers 13 and 14 and the shutter 11 almost at the same time and it can be easily understood that the means 53 comprises mainly the slider 4, coil spring 5 and wires 6. It can be also easily understood from FIGS. 4 and 5 that the moving speed of the drive source 1 is converted to force for shifting the shutter 11 to open the opening 10 by means of the power converting system 53, that the shutter 11 keeps the opening 10 opened while the motor 1 is being driven because the extent to which the shutter 11 is shifted is previously limited, and that the shutter 11 is returned to the opening-closed position because the motor 1 is stopped when the carrying of the optical card 18 is finished.

Although the coil spring has been used to return the slider 4 to its original position in the above-described example, it is not necessarily limited to the coil spring 5 but it may depend only upon the returning force of the wires 6.

According to the above-described drive system, the optical card 18 can be inserted into the housing 50 through the opening 10 without contacting or striking against the shutter 11, thereby preventing the optical card 18 from being damaged by the shutter 11. In addition, the shutter 11 is shifted up and down, using the source for driving the conveying system, and this makes it unnecessary to use a power source only to shift the shutter 11 up and down. As the result, the drive system can be smaller-sized and made lower in cost.

Another embodiment of the drive system according to the present invention will be described with reference to FIGS. 6A and 6B. Same components as those in the above-described example will be represented by same reference numerals and description on these components will be simplified or omitted.

The motor 1 is fixed to the housing 50, extending its rotating shaft 2 in left and right directions (or direction perpendicular to the forward and backward directions of the motor) and a sun gear 19a is fixed, coaxial to the motor 1, to the front end of the rotating shaft 2. A gear 24 coaxially connected to the conveying roller 13 is engaged with the sun gear 19a, thereby enabling the conveying roller 13 to be rotated by the motor 1.

A planet gear 19b having a smaller radius is meshed with the sun gear 19a. The planet gear 19b is rotatably pivoted on one end of a rotary arm 20 whose other end is pivoted coaxial to the sun gear 19a. A winding shaft 23 is coaxially from the other end of the rotary arm 20. When the sun gear 19a is rotated, therefore, the rotary arm 20 is rotated round its other end together with the winding shaft 23 through the planet gear 19b. One end of a wire 22 which is connected to the lower end of the shutter 11 at the other end thereof is fixed to the outer circumference of the winding shaft 23. This wire 22 is guided round a pulley 21 which keeps the wire 22 tensioned. The pulley 21 is supported by the housing 50 in such a way that it can be moved up and down and locked at a certain position. The shutter 11 is usually urged upward by a compression coil spring 60 to close the opening 10.

It will be described how the second embodiment of the drive system is operated.

Figure 6A:
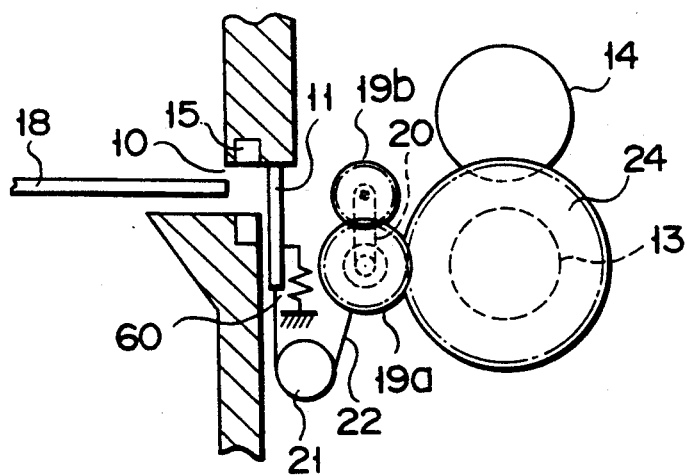
FIGS. 6A and 6B are side and plan views schematically showing another embodiment of the drive system for use with the information recording and reproducing apparatus according to the present invention.
Figure 6B:
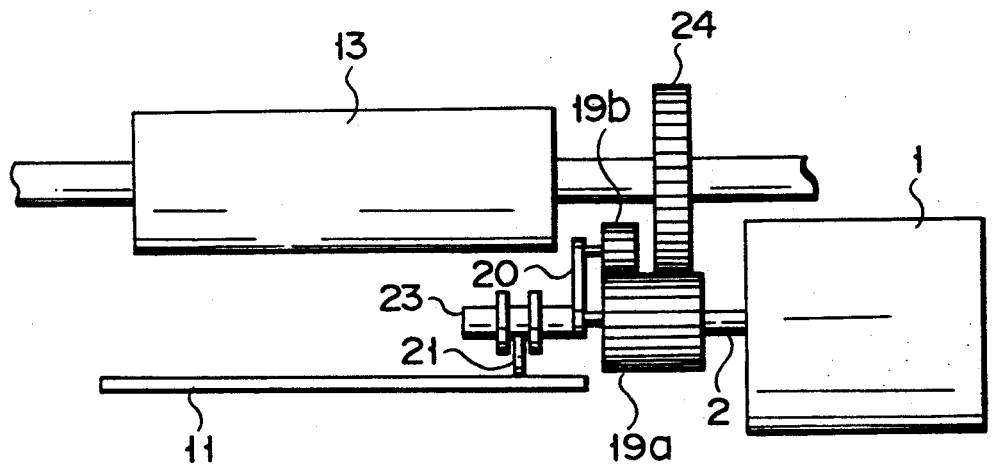

When the optical card 18 inserted into the opening 10 is detected by the photo-interrupter 15, the motor 1 is rotated to rotate the conveying roller 13 clockwise in FIG. 6A and the conveying system comprising the rollers 13 and 14 is thus made ready for further conveying the optical card 18 into the housing 50. At the same time, the winding shaft 23 is rotated clockwise via the planet gear 19b and the rotary arm 20 to wind up the wire 22. As the result, the shutter 11 is lowered against the compression coil spring 60 to thereby open the opening 10. After the opening 10 is opened, the further lowering of the shutter 11 is stopped by a stopper of a guide means (not shown) and the further rotating of the winding shaft 23 is thus stopped. As the result, the rotating force of the rotary arm 20 caused by the sun gear 19a can be absorbed by the idling of the planet gear 19b.

When the carrying of the inserted optical card 18 by the conveying system is finished, the motor 1 is stopped. No rotating force is therefore added to the planet gear 19a by the sun gear 19a, thereby leaving the winding shaft 23 free, and the shutter 11 is thus lifted by the compression coil spring 60 to close the opening 10. The winding shaft 23 is rotated this time in the reverse direction through the wire 22 and the planet gear 19b is returned to its original position through the rotary arm 20.

The motor 1 is reversely rotated when the optical card 18 is to be discharged outside the housing 50, and the conveying roller 13 is thus rotated anti-clockwise in FIG. 6A to make the conveying system ready for discharging the optical card 18 outside the housing 50. The winding shaft 23 is rotated, although reversely, as seen in the case where the optical card 18 is inserted into the housing 50 through the opening 10, and the wire 22 is thus wound up to move the shutter 11 to the opening-opened position. As the result, the optical card 18 is discharged outside the housing 50 through the opening 10.

It can be easily understood that the second drive system is same in fundamental operation and can attain same merits as the first one.

Although the optical card has been used as the information recording medium in the above-described examples, the present invention can also be applied to other information recording media such as the magnetic card. Further, the opening through which the optical card is inserted into and discharged out of the housing may be used only to insert the card into the housing or discharge it out of the housing. Another opening through which the card is discharged out of the housing is needed in the former case and another opening through which the card is inserted into the housing is needed in the latter case. In addition, another conveying system is also needed in any of these cases. Although description has been made on the apparatus which has both functions of recording and reproducing information on and from the optical card in the above examples, the present invention can be applied to the apparatus which has one of these functions, and the term "recording and reproducing" used throughout the specification means "recording and/or reproducing".

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A driving device for an information recording/reproducing apparatus which comprises a housing provided with an opening through which an information recording medium is inserted into the housing; shutter means located at the opening of the housing to selectively move between a position where the shutter means opens the opening to allow the information recording medium to be inserted into the housing through the opening thus opened and another position where the shutter means closes the opening to prevent the information recording medium from being inserted into the housing; and conveying means housed in the housing and made ready or not ready for carrying the information recording medium which has been inserted into the housing, the drive device comprising
drive source means;
control means for controlling the drive source means; and
transmitting means for connecting the drive source means to the shutter means and to the conveying means in action and to moving the shutter means to the opening-opened position while making the conveying means ready for carrying the information recording medium in response to the drive source means when the drive source means is driven by the control means.

2. The drive device according to claim 1, wherein said transmitting means moves the shutter means to the opening-closed position while making the conveying means not ready for carrying the information recording medium in response to the drive source means when this drive source means is stopped by the control means.

3. The drive device according to claim 2, wherein said shutter means has a shutter linearly movable in the housing to open and close the opening, said conveying means has conveying rollers rotated to become ready for carrying the information recording medium, and said transmitting means moves the shutter while rotating the conveying rollers in response to the drive source means.

4. The drive device according to claim 3, wherein said drive source means has a motor provided with a rotating shaft, and said transmitting means has a first means for changing the rotation force of the rotating shaft to the linear movement of the shutter and second means for changing the rotation force of the rotating shaft to the rotation of the conveying rollers.

5. The drive system according to claim 4, wherein said first changing means includes a slider attached to the rotating shaft to move along it, means for moving the slider responsive to the rotation force of the rotating shaft when this shaft is rotated, and link means for connecting the slider to the shutter to move the shutter in response to the movement of the slider, and said second changing means includes gear trains for connecting the rotating shaft to the conveying rollers.

6. The drive device according to claim 4, wherein said first changing means includes a winding shaft, sun-and-planet gear means located between this winding shaft and the rotating shaft to rotate the winding shaft responsive to the rotation force of the rotating shaft when this rotating shaft is rotated, and line means wound or unwound round the winding shaft to move the shutter as the winding shaft is rotated, and said second changing means includes gear trains for connecting the rotating shaft to the conveying rollers.

7. The drive device according to claim 1, wherein said shutter means has a shutter movable in the housing to open and close the opening, said conveying means has conveying members driven to become ready for carrying the information recording medium, and said transmitting means moves the shutter and drives the conveying members substantially at the same time, when said drive source means is driven.

8. A drive device for an information recording and reproducing apparatus comprising a housing provided with an opening through which an information recording medium is inserted into and discharged out of the housing; shutter means located at the medium inserting and discharging opening to selectively move between a position where said shutter means opens the opening to allow the information recording medium to be inserted into and discharged out of the housing and another position where said shutter means closes the opening to prevent the information recording medium from being inserted into and discharged out of the housing; and conveying means housed in the housing and selectively brought into a first conveying state under which the information recording medium inserted into the housing can be carried in one direction, into a second conveying state under which the information recording medium can be carried in the other direction, and into non-conveying state under which the information recording medium cannot be carried;

the drive device comprising drive source means;

control means for controlling the drive means; and transmitting means for connecting the drive source means to the shutter means and to the conveying means in action and to move the shutter means to the opening-opened position while bringing the conveying means into one of the first and second conveying states in response to the drive source means when this drive source means is driven by the control means.

9. The drive device according to claim 8, wherein said transmitting means moves the shutter means to the opening-closed position while bringing the conveying means into the non-conveying state, even if it is under the first or second conveying state, in response to the drive source means when this drive source means is stopped by the control means.

* * * * *